(12) United States Patent
Kanda et al.

(10) Patent No.: US 8,465,092 B2
(45) Date of Patent: Jun. 18, 2013

(54) SEAT BACK FRAMEWORK

(75) Inventors: Kenji Kanda, Tokyo (JP); Masaaki Honda, Tokyo (JP); Yosuke Karino, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 232 days.

(21) Appl. No.: 13/006,812

(22) Filed: Jan. 14, 2011

(65) Prior Publication Data

US 2011/0215619 A1 Sep. 8, 2011

(30) Foreign Application Priority Data

Mar. 4, 2010 (JP) ................. 2010-047527

(51) Int. Cl.
*B60N 2/42* (2006.01)
*B60R 21/00* (2006.01)
*A47C 7/02* (2006.01)

(52) U.S. Cl.
USPC ................. 297/216.14; 297/452.18

(58) Field of Classification Search
USPC ............ 297/452.18, 216.13, 216.14
See application file for complete search history.

(56) References Cited

U.S. PATENT DOCUMENTS 7,758,114 B2 7/2010 Yokota et al.
2004/0227389 A1* 11/2004 Yoshida .................. 297/452.18

FOREIGN PATENT DOCUMENTS

JP 2009107571 A 5/2009

* cited by examiner

*Primary Examiner* — Milton Nelson, Jr.
(74) *Attorney, Agent, or Firm* — Browdy and Neimark, PLLC

(57) ABSTRACT

In an upper frame member of seat back framework, an upward-slippage prevention portion is simply defined to prevent a seat occupant's back portion from being slipped or dislocated on and along a seat back in the case of rear-end collision. The upward-slippage prevention portion has a sloped region for receiving the seat occupant's back portion which is to be slipped or dislocated on and along the seat back under inertia when a rear-end collision occurs and thereby preventing an undesired upward slippage or dislocation of that seat occupant's back portion which will result in damage of his or her neck or cervical vertebrae.

11 Claims, 2 Drawing Sheets

SEAT BACK FRAMEWORK

BACKGROUND OF THE INVENTION

1. Field of the Invention

The present invention relates to a seat back framework of a vehicle seat so designed to protect a body of seat occupant on the seat against damages in the case of a rear-end collision. In particular, the invention is directed to a simplified seat back framework of vehicle seat for preventing a seat occupant against upward dislocation on and along the seat back in order to protect the neck or cervical vertebrae of the seat occupant against damage in the case of rear-end collision.

2. Description of Prior Art

Hitherto, there have been known various kinds of vehicle seats designed to protect a body portion of seat occupant on the seat against damage in the case of a rear-end collision. In particular, to protect a neck (or cervical vertebrae) of seat occupant, various kinds of arrangements are known and incorporated in the vehicle seats. For example, as disclosed from the U.S. Pat. No. 7,758,114, an active headrest arrangement is provided in a seat back of vehicle seat, which comprises: a pressure receiving member movably provided in a seat back frame at a point where a seat occupant's back portion is to be positioned; and a movable headrest operatively connected with the pressure receiving member. According thereto, when a rear-end collision occurs, a backward load is applied from the seat occupant, under inertia, to the pressure receiving member which is in turn moved in the backward direction. At that moment, the seat occupant's back portion rested on that pressure receiving member well as the seat occupant's head are simultaneously displaced in the likewise backward direction. Responsive to such backward displacement of pressure receiving member, the headrest is automatically moved in forward direction, so that the seat occupant's head is quickly received by the headrest and thus protected against damage, which in effect protects a neck of the seat occupant against damage as well.

On the other hand, known is a protection arrangement in seat back, which does not require the foregoing movement of headrest, but simply requires a deformation or disconnection of constituent members in the seat back frame to bring the seat occupant's head to a stationary headrest fixed and unmoved on the seat back frame, so that the head (and seat occupant's neck as well) is protected against damage in the case of rear-end collision. For example, as disclosed from the Japanese Laid-Open Patent Publication No. 2009-107571 or JP 2009-107571 A, a spring support assembly of substantially flat configuration is disposed in a seat back frame, such that two lateral ends of the spring support assembly are releasably attached to the respective two lateral frame members of the seat back frame by means of releasable connecting members. According thereto, normally, the seat occupant's back portion is resiliently supported by that spring support assembly, but, when a rear-end collision occurs, upon receiving an excessive degree of backward load from the seat occupant, the connecting members are forcibly deformed and disconnected from the lateral frame members of seat back frame. Due to such disconnection of connecting members, the spring support assembly as well as the seat occupant's body are further displaced backwardly beyond a normal backward support limit, whereby the seat occupant's head is quickly received by the stationary headrest and protected against damage, which therefore protects his or her neck as well.

However, the above-described prior art seat back structures have encountered the following defective aspects:

(i) In assembly of the seat back, a great number of parts and mechanisms are required, which results in a complicated and time-consuming construction of the seat back and a highly increased costs involved.

(ii) All the arrangements stated above do not take into account the fact that the seat back itself is normally in a backwardly inclined state, which means that the seat back provides a condition for allowing the back portion of seat occupant to be easily slipped and slid on and along the inclined surface of seat back. As a consequence thereof upon occurrence of rear-end collision, the seat occupant's upper body portion is sunk into the backwardly inclined surface of seat back, but quickly slipped upwards at the same time on and along such inclined surface of seat back, thus increasing the possibility that the seat occupant's head will be dislocated upwards from a predetermined support point in the headrest, and therefore the seat occupant's head will not be properly received by the headrest, which will result in his or her neck (i.e. cervical vertebrae) being damaged.

SUMMARY OF THE INVENTION

In view of the above-stated drawbacks, it is a primary purpose of the present invention to provide an improved seat back framework which is of a much simplified structure effective for preventing undesired upward slippage or dislocation of seat occupant's back portion on and along the seat back.

In order to achieve such purpose, a seat back framework in accordance with the present invention is basically comprised of;

an upper frame member disposed adjacent to an upside of the seat back;

a slippage prevention portion for preventing a seat occupant on the vehicle seat from being slipped or slid on and along the seat back in a direction upwardly of the seat back, when the seat occupant is moved backwardly of the seat back under inertia to contact the seat back in case of a rear-end collision;

the slippage prevention portion being defined in the upper frame member and having a sloped region which is inclined forwardly of the seat back framework from the upper frame member, and the slippage prevention portion being so adapted that the sloped region thereof is to receive a back portion of the seat occupant who is to be slipped or slid on and along the seat back in the direction upwardly of the seat back in the case of rear-end collision, thereby preventing upward slippage of the seat occupant on and along the seat back.

Preferably, an angle of inclination by which the sloped region is inclined forwardly of the seat back framework from the upper frame member is set to be about a right angle with respect to a locus or path along which the back portion of the seat occupant is to be slipped or slid on and along the seat back in the direction upwardly of the seat back in the case of rear-end collision.

As one mode of the invention, the upper frame member may be made of a sheet metal, with the slippage prevention portion protruding from that upper frame member of sheet metal in a direction forwardly of the seat back framework, such that the sloped region thereof provides a flat sloped surface inclined in a direction forwardly and upwardly of the seat back framework.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 1 to 4, there is illustrated a preferred embodiment of seat back framework of a vehicle seat in accordance with the present invention, wherein the seat back framework is generally designated by (BF).

Figure 1:
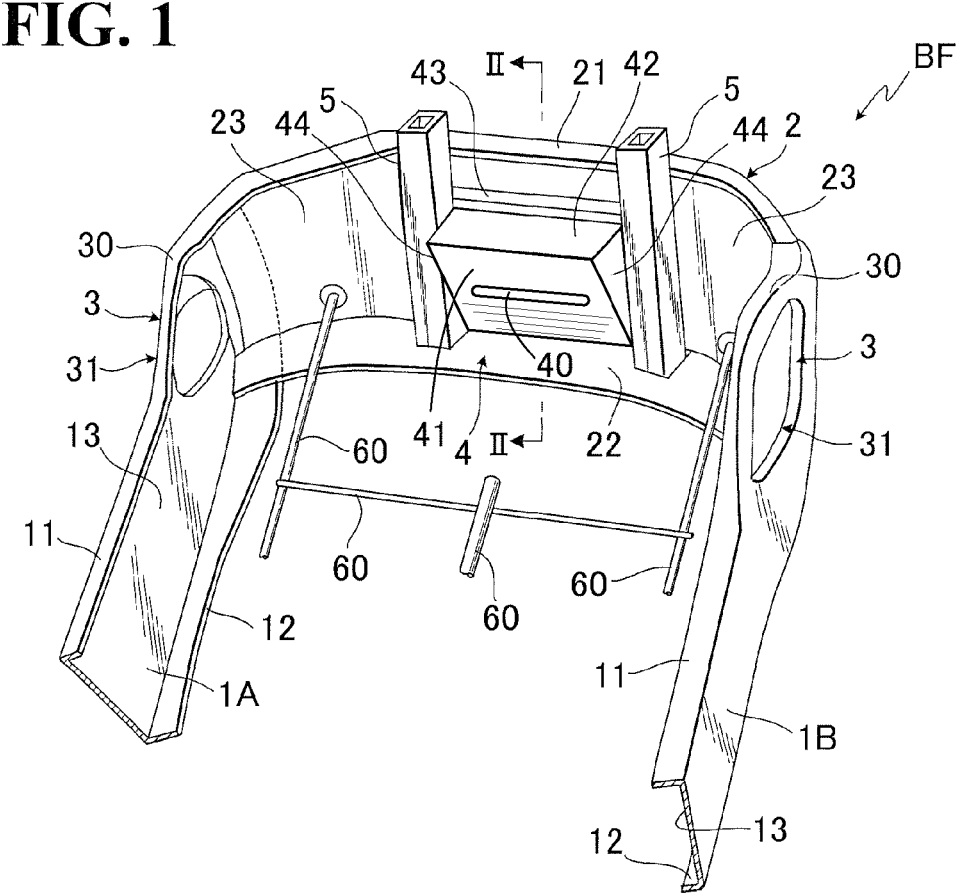
FIG. 1 is a partly broken perspective view showing a seat back framework in accordance with the present invention.

As seen in FIG. 1, the seat back framework (BF) includes an upper frame member (2) and a pair of lateral frame members (1A) and (1B). The two lateral frame members (1A) (1B) are at the respective upper end portion thereof welded to the two end portions of the upper frame member (2), respectively. Though not shown, a lower frame member is connected between two lower end portions respectively of the two lateral frame members (1A) (1B).

It is to be noted that, hereinafter, the wording "forward" or "forwardly" refers to a forward side (FW) facing forwardly of the seat back framework (BF), whereas the wording "backward" or "backwardly" refers to a backward side (BW) facing backwardly of the seat back framework (BF).

As far as the illustrated embodiment is concerned, the seat back framework (BF) is formed by a sheet-metal working process into an appropriate framework configuration.

Figure 2:
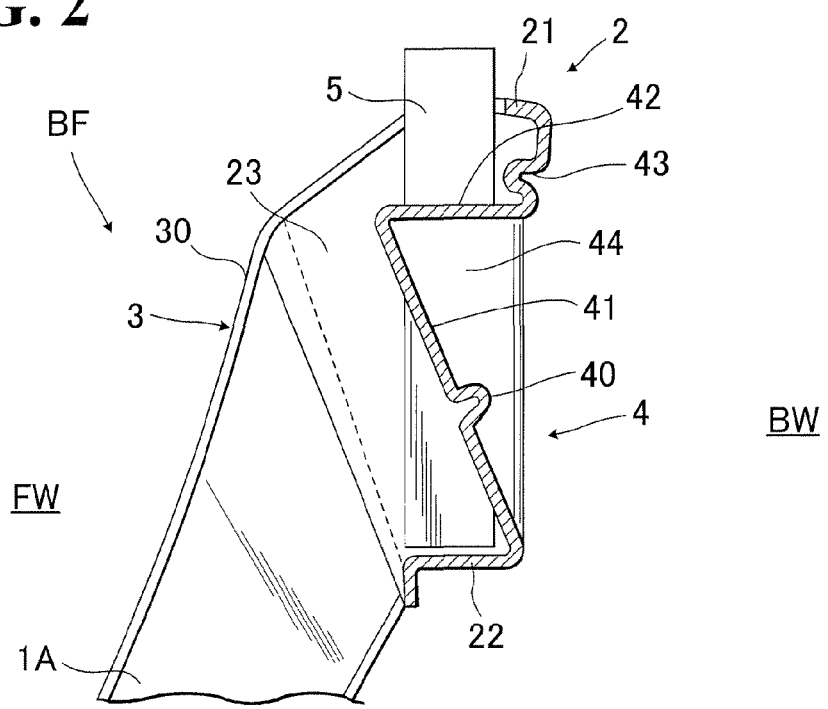
FIG. 2 is a sectional view taken along the line II-II, which shows an upward-slippage prevention portion provided in the seat back framework.
Figure 3:
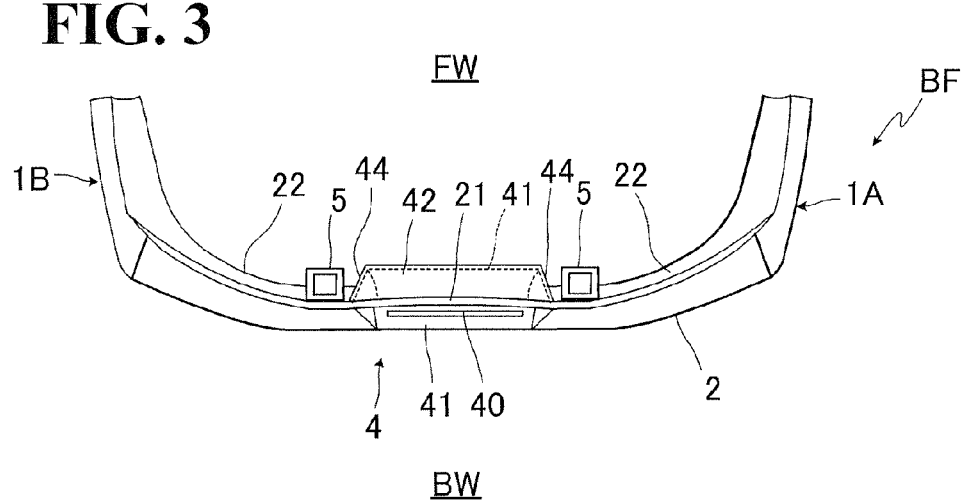
FIG. 3 is a partly broken plan view of the seat back framework.

Namely, the upper frame member (2) is formed from a sheet-metal material into a backwardly-inclined and substantially inverted-U-shaped configuration including a pair of backwardly inclined arcuate lateral wall portions (23) and (23) which are curved and inclined backwardly relative to the vertically extending two lateral frame members (1A) (1B) to such a extent that a midway flat wall portion between those two arcuate flat wall portions (23) (23) stands vertically, as can be seen from FIGS. 2 and 3.

A first flange portion (21) is formed integrally in one edge of the upper frame member (2) so as to extend at substantially a right angle therefrom in a direction inwardly of the seat back framework (BF), whereas likewise, a second flange portion (22) is formed integrally in the other opposite edge of the upper frame member (2) so as to extend at substantially a right angle therefrom in a direction inwardly of the seat back framework (BF). Those first and second flange portions (21) (22) are adapted for reinforcing the sheet-metal structure of upper frame member (2) to provide a required rigidity to the upper frame member (2) itself.

Also, the pair of lateral frame members (1A) and (1B) are each formed from a sheet-metal material into the shown configuration which has, defined therein, a flat wall portion (13), a front flange portion (11), and a rear flange portion (12). For both of the two lateral frame members (1A) (1B) in common, it is observed from FIGS. 2 and 3 that the front flange portion (11) is formed integrally in a forwardly facing edge of the lateral frame member (1A or 1B) so as to extend at substantially a right angle therefrom in a direction inwardly of the seat back framework (BF), whereas likewise, the rear flange portion (12) is formed integrally in a backwardly facing edge of the lateral frame member (1A or 1B) so as to extend at substantially a right angle therefrom in a direction inwardly of the seat back framework (BF). Such formation of the two flange portions (11) (12) serves to reinforce the sheet-metal structure of each of the two lateral frame members (1A) (1B) to provide a required rigidity therein.

Designations (60) denote a plurality of wire spring members or a spring support assembly provided inwardly of the seat back framework (BF), which are adapted for resiliently supporting a foam padding (P) (see FIG. 4) as well as a back portion (MB) of a seat occupant (M).

Designations (5) denote a pair of spaced-apart headrest stay holders fixedly attached to the aforementioned midway flat wall portion of the upper frame member (2), as can be seen in FIGS. 1 and 2. Each of the two headrest stay holders (5) is of a substantially tubular shape having a though-bore formed therein, and therefore, as understandable from FIG. 4, a pair of stays (8) of headrest (HR) are slidably inserted and supported in those two holders (5), respectively, as known in the art.

In accordance with the present invention, an upward-slippage prevention element is provided in the above-described seat back framework (BF) in order to prevent upward slippage of seat occupant's back portion on and along the frontal surface of seat back in the case of rear-end collision. As stated in the description of prior art, the seat back itself is normally in a backwardly inclined state, hence allowing the back portion of seat occupant to be easily slipped and slid on and along the backwardly inclined surface of seat back. As a result thereof, when a rear-end collision occurs, the seat occupant's upper body portion is pressed against and received by the seat back, under backward inertia, but quickly slipped upwards on and along the backwardly inclined surface of seat back. It is thus highly possible that the seat occupant's head will be dislocated from a predetermined support point in the headrest, and therefore the head and neck of seat occupant will not be properly received by the headrest and eventually damaged.

With the foregoing problem in view, according to the shown embodiment, an upward-slippage prevention portion (4) is formed in the previously stated midway flat wall portion of the upper frame member (2) between the two backwardly-inclined arcuate lateral wall portions (23) (23) for the purpose of preventing the above-stated upward slippage of seat occupant's upper body portion.

Formation of such upward-slippage prevention portion (4) is by subjecting the afore-stated midway flat wall portion of upper frame member (2) to a press working process using proper stamping dies, such that a sloped surface (at 41) is defined therein in a manner projecting forwardly of the upper frame member (2). Specifically stated, that midway flat wall portion of upper frame member (2) is stamped or pressed so as to protrude forwardly of the seat back framework (BF) and assume the illustrated three-dimensional configuration that has, defined therein, an upper horizontal wall region (42), a pair of lateral triangular wall regions (44) and (44), and a sloped wall region (41).

As shown, the sloped wall region (41) extends upwardly and aslant from the second flange portion (22) to the upper horizontal wall region (42), thereby providing an upwardly and forwardly sloped surface that is in turn oriented downwardly of the seat back framework (BF). As best seen in FIG. 2, the upper portion of the sloped wall region (41) projects more forwardly than the headrest stay holders (5) as well as than the two flange portions (21) (22). Hence, the sloped wall region (41) is inclined forwardly and upwardly from the upper frame member (2).

As will be elaborated, the sloped wall region (41) is a main area for receiving an upper localized part of seat occupant's back portion (MB) which is to be moved backwardly and upwardly in the case of rear-end collision, thereby insuring to prevent backward and upward movement of that seat occupant's back portion (MB).

Designation (40) denotes a reinforcing bead formed in the foregoing sloped wall region (41), which is adapted for reinforcing the sloped wall region (41) per se. Namely, when a great backward and upward load is applied to the sloped wall region (41) from a seat occupant in the case of rear-end collision, the reinforcing bead (40) serves to prevent backward and upward deformation (or recession) of that sloped wall region (41).

Designation (43) denotes another reinforcing bead which is formed in the upper frame member (2) in the proximity of the above-stated upper horizontal wall region (42) so as to extend adjacent to and alongside of that upper horizontal wall region (42). This reinforcing bead (43) reinforces a foot base area of the upper horizontal wall region (42) to prevent backward deformation (or buckling) of such foot base area, when the previously mentioned great backward and upward load is applied thereto, thereby preventing backward inclination of the sloped wall region (41).

Of course, those two reinforcing beads (40) and (43) are formed during the above-described stamping work process to form the upward-slippage prevention portion (4).

Figure 4:
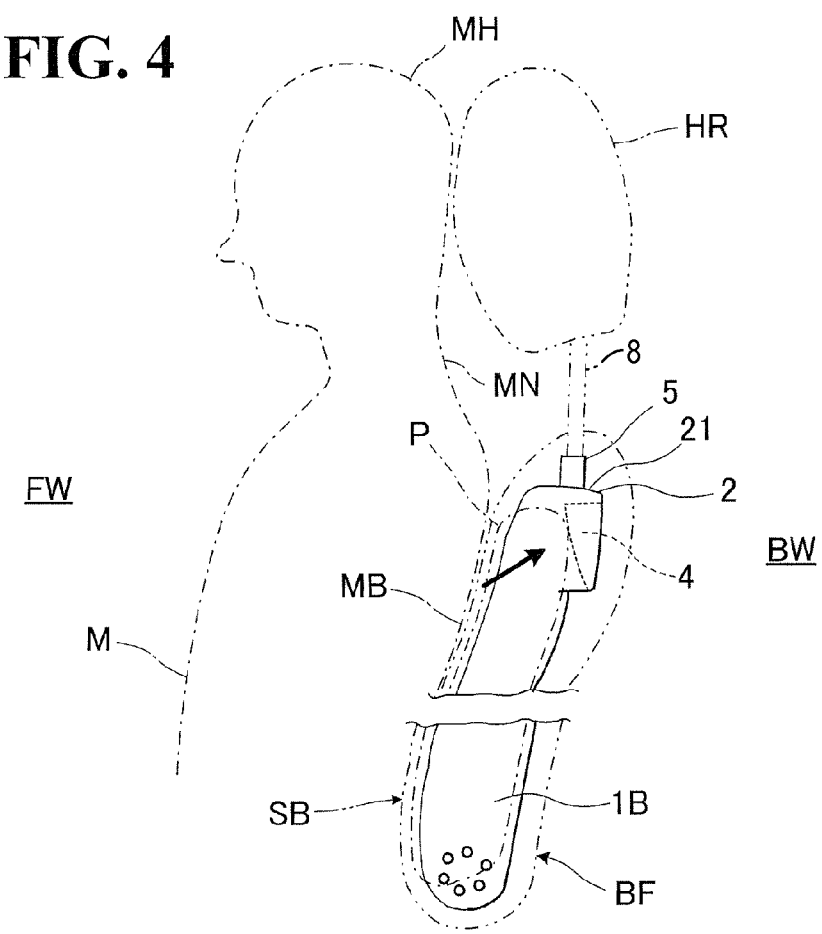
FIG. 4 is a diagram for explanatorily showing how the upward-slippage prevention portion works to prevent a seat occupant against upward slippage on and along a seat back.

As indicated by the two-dot chain lines in FIG. 4, the above-constructed seat back framework (BF) is properly upholstered to constitute a seat back (SB), using a trim cover assembly (not shown) and a foam padding (P). In this regard, it is to be seen that the foam padding (P) is disposed in the seat back framework (BF) and that the upper portion of the foam padding (P) overlies and contacts the above-described upward-slippage prevention portion (4). With this arrangement, normally, the back portion (MB) of seat occupant (M) is resiliently supported by the foam padding (P) as well as by the previously mentioned wire spring members (60), so that the seat occupant's back portion (MB) is normally kept out of contact with the rigid upward-slippage prevention portion (4). Thus, the seat occupant (M) normally does not feel any objectionable hard touch on the seat back, even when being subjected to vibrations and lurches during normal running of car or vehicle.

Now, a description will be made of how the upward-slippage prevention portion (4) works in effect, referring to FIG. 4. Upon occurrence of a rear-end collision, the seat occupant (M) is abruptly displaced backwards under inertia toward the seat back (SB) in which the above-described seat back framework (BF) is provided, and his or her back portion (MB) is pressed against the frontal surface of the seat back (SB). Then, since the seat back (SB) is normally inclined in a slightly backward direction to provide a backwardly sloped surface, the seat occupant's back portion (MB) is naturally slipped or slid on and along such backwardly sloped surface of seat back (SB) in a direction upwardly and backwardly of that seat back (SB), while being sunk into the seat back (SB) or the foam padding (P) at the same time. But, at that moment, the upper part of the seat occupant's back portion (MB) is quickly brought to contact with the afore-said sloped wall region (41) of the upward-slippage prevention portion (4) via the foam padding (P), whereby the upper body portion of the seat occupant (M) is positively prevented against backward and upward slippage on the seat back (B). This insures to prevent dislocation of the seat occupant's head (MH) from a predetermined head receiving point in the headrest (HR), so that the head (MH) will be received and supported by the headrest (HR) at that head receiving point, thereby protecting the neck (MN) (or cervical vertebrae) of seat occupant against damage in the case of rear-end collision.

In this context, it is important to determine an angle of inclination by which the sloped wall region (41) is inclined forwardly with respect to the midway flat wall portion of upper frame member (2) in order to insure preventing the backward and upward slippage of the seat occupant's back portion (MB). Such angle of forward indication of the sloped wall region (41) should be set to be about a right angle relative to a locus or path along which the upper part of seat occupant's back portion (MB) is to be slipped on and sunk into the frontal surface of seat back (SB) upwardly and backwardly in the case of rear-end collision. Of course, the position of the sloped wall region (41) should be set at a proper point in the upper frame member (2), considering a tolerable limit of slight slippage of the seat occupant's upper body portion towards the sloped wall region (41) in order to insure that the seat occupant's head (MH) is received by the headrest (HR) at a predetermined head receiving point.

Designations (3) and (3) denotes a pair of shoulder receiving portions of impact absorption type defined in the pair of left- and right-side lateral frame members (1A) and (1B), respectively. In brief, those two shoulder receiving portions (3) are each formed with a recessed main area (31), so that, in the case of rear-end collision, the two shoulder portions of seat occupant (M) are first received by the respective two shoulder receiving areas (31), respectively, and blocked against upward and backward displacement, prior to the seat occupant's back portion (MB) being moved upwardly and backward towards the upper frame member (2), thereby preventing undesired displacement of seat occupant's vertebra close to the upper frame member (2). But, those two shoulder receiving portions (3) are not the subject matter of the present invention and any further description will not be made thereof.

It is added that the provision of the above-formed upward-slippage prevention portion (4) is advantageously effective in reinforcing an area to which the two headrest stay holders (50) are fixedly attached, thus giving an increased rigidity to the headrest stay holders (50) themselves, so that the headrest (HR) is reliably and firmly supported by the headrest stay holders (50).

In accordance with the present invention, in addition to the above-described effect for preventing upward slippage of the seat occupant's upper body portion, the upward-slippage prevention portion (4) per se can easily be provided by simply defining a forwardly sloped surface in the seat back framework, such as the afore-said sloped wall region (41), which greatly simplifies the structure of seat back framework and do not require any other parts.

The above descriptions have been given only for the instance where the upward-slippage prevention portion (4) is formed by a press working process in the sheet-metal seat back framework (BF). But, in the case of the seat back framework (BF) being formed by tubular frame members or thin frame members, a separate sloped plate member identical to the sloped wall region (41) described above, or a suitable rigid member substantially identical in configuration to the upward-slippage prevention portion (4), may be provided and firmly connected with the tubular or thin frame members, where appropriate, in order to prevent the above-described backward and upward movement of the seat occupant's back portion.

While having described the present invention thus far, it is to be understood that the invention is not limited to the illustrated embodiment, but any modification, addition and replacement may be applied thereto, without departing from the scopes of the appended claims.

What is claimed is:

1. A seat back framework in a seat back of a vehicle seat, the seat back having a surface facing forwardly of the vehicle seat, on which surface, a back portion of a seat occupant is to rest, comprising:
    an upper frame member disposed adjacent to an upside of the seat back;
    a slippage prevention portion for preventing a seat occupant on the vehicle seat from being slipped or dislocated on and along the seat back in a direction upwardly of the seat back, when said back portion of said seat occupant is moved backwardly of the seat back under inertia and pressed against said surface of the seat back in case of a rear-end collision;
    said slippage prevention portion being defined integrally in said upper frame member so as to protrude towards said surface of the seat back and having a sloped region which is inclined in a direction forwardly and upwardly of said seat back framework, and
    said slippage prevention portion being so adapted that said sloped region thereof is to receive said back portion of said seat occupant who is to be dislocated in the direction upwardly of the seat back in said case of rear-end collision, thereby preventing upward slippage of said back portion of said seat occupant on and along said surface of said seat back.

2. The seat back framework as claimed in claim 1, wherein an angle, of inclination by which said sloped region is inclined forwardly and upwardly with respect to said upper frame member is set to be about a right angle with respect to a locus or path along which said back portion of said seat occupant is to be dislocated on and along said surface of said seat back in the direction upwardly and inwardly of the seat back in the case of rear-end collision.

3. The seat back framework as claimed in claim 1, wherein said sloped region is formed flat, thus having a flat sloped surface defined therein.

4. The seat back framework as claimed in claim 1, wherein said upper frame member is made of a sheet metal, and said slippage prevention portion is formed by stamping or pressing a predetermined local area of said upper frame member of said sheet so as to protrude therefrom in a direction forwardly of the upper frame member, such that said sloped region thereof provides a flat sloped surface inclined in a direction forwardly and upwardly of the seat back framework towards said surface of said seat back.

5. The seat back framework as claimed in claim 1, wherein said upper frame member is formed from a sheet metal.

6. A seat back framework in a seat back of a vehicle seat, the seat back having a surface facing forwardly of the vehicle seat, on which surface, a back portion of a seat occupant is to rest, comprising:
    an upper frame member disposed adjacent to an upside of the seat back, said upper frame member having a front surface facing forwardly of the seat back framework towards said surface of said seat back;
    at least one support element for supporting a headrest disposed above said upside of said seat back, so that said head rest is adapted to be disposed at a position for receiving and supporting a head of said seat occupant at a predetermined support point;
    a slippage prevention portion for preventing said seat occupant on the vehicle seat from being slipped or dislocated on and along the seat back in a direction upwardly of the seat back, when said back portion of said seat occupant is moved backwardly of the seat back under inertia, while being pressed against and slid on an along said surface of the seat back in case of a rear-end collision;
    said slippage prevention portion being defined integrally in said front surface of said upper frame member so as to protrude towards said surface of the seat back and having a sloped region which is inclined in a direction forwardly and upwardly of said seat back framework, and
    said at least one support element being fixedly provided to said front surface of said upper frame member, adjacent to said slippage prevention portion; and
    said slippage prevention portion being so adapted that said sloped region thereof is to receive said back portion of said seat occupant who is to be dislocated in the direction upwardly of the seat back with concurrent upward dislocation of said head of said seat occupant on said headrest, in said case of rear-end collision, thereby preventing upward slippage of said back portion of said seat occupant on and along said surface of said seat back, while preventing said head of said seat occupant against upward dislocation from said predetermined support point of said headrest.

7. The seat back framework as claimed in claim 6, wherein an angle of inclination by which said sloped region is inclined forwardly and upwardly with respect to said upper frame member is set to be about a right angle with respect to a locus or path along which said back portion of said seat occupant is to be dislocated on and along said surface of said seat back in the direction upwardly and inwardly of the seat back in the case of rear-end collision.

8. The seat back framework as claimed in claim 6, wherein said sloped region is formed flat, thus having a flat sloped surface defined therein.

9. The seat back framework as claimed in claim 6, wherein said upper frame member is formed from a sheet metal.

10. The seat back framework as claimed in claim 6, wherein said upper frame member is made of a sheet metal, and slippage prevention portion is formed by stamping or pressing a predetermined local area of said upper frame member of said sheet so as to protrude therefrom in a direction forwardly of the upper frame member, such that said sloped region thereof provides a flat sloped surface inclined in a direction forwardly and upwardly of the seat back framework towards said surface of said seat back.

11. The seat back framework as claimed in claim 6, wherein said upper frame member is formed from a sheet metal, wherein said slippage, prevention portion is formed by stamping or pressing a predetermined local area of said upper frame member of said sheet metal so as to protrude the direction forwardly of the upper frame member, such that said sloped region thereof provides a flat sloped surface inclined in the direction forwardly and upwardly of the seat back framework, and wherein said at least one support element comprises a pair of support elements for supporting said headrest, said pair of support elements being disposed on the opposite sides of the thus-formed slippage prevention portion.

* * * * *